F. RATCLIFF,
Assignor of one-third interest to F. S. SHIRLEY.
Calendar.
No. 9,390. Reissued Sept 28, 1880.
Fig. 1.
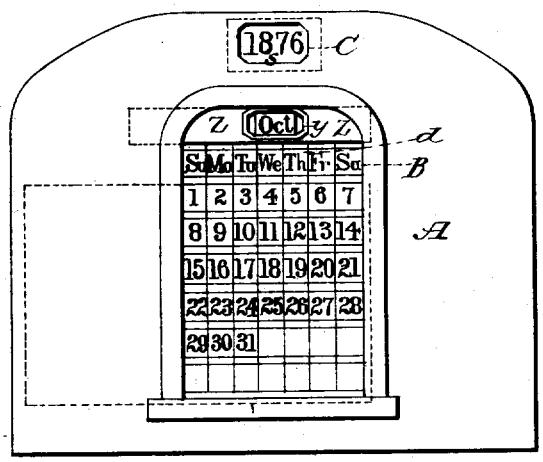
Fig. 2.
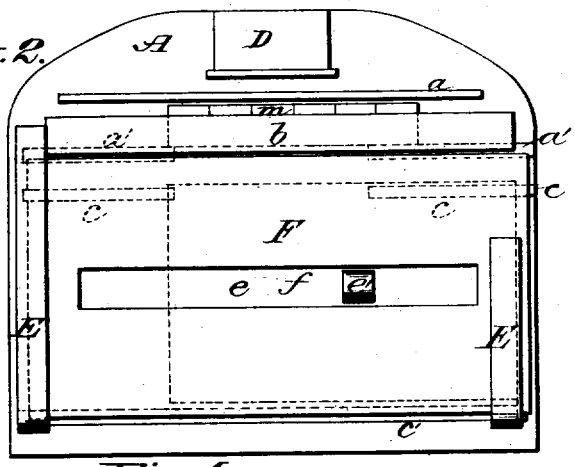
Fig. 3.
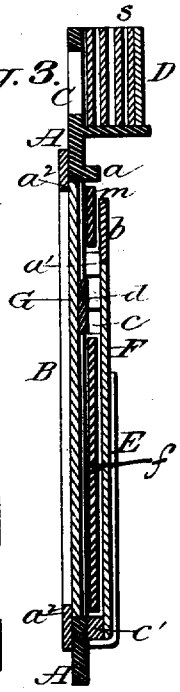
Fig. 4.
| | | | | | | | | | | | | |
|---|---|---|---|---|---|---|---|---|---|---|---|---|
| | | | | | | 1 | 2 | 3 | 4 | 5 | 6 | 7 |
| 2 | 3 | 4 | 5 | 6 | 7 | 8 | 9 | 10 | 11 | 12 | 13 | 14 |
| 9 | 10 | 11 | 12 | 13 | 14 | 15 | 16 | 17 | 18 | 19 | 20 | 21 |
| 16 | 17 | 18 | 19 | 20 | 21 | 22 | 23 | 24 | 25 | 26 | 27 | 28 |
| 23 | 24 | 25 | 26 | 27 | 28 | 29 | 30 | 31 | | | | |
| 30 | 31 | | | | | | | | | | | |
f
m
| | | | | | |
|---|---|---|---|---|---|
| Jan | Feb | Mar | Apr | May | Jun |
Fig. 5.
m
| | | | | | |
|---|---|---|---|---|---|
| July | Aug | Sep | Oct | Nov. | Dec |
Witnesses:
Thomas A. Tripp.
Chas. F. Swift
Inventor:
Frederick Ratcliff
per
J. A. Howard
Atty.
N. PETERS, PHOTO-LITHOGRAPHER, WASHINGTON, D. C.

UNITED STATES PATENT OFFICE.

FREDERICK RATCLIFF, OF NEW BEDFORD, MASSACHUSETTS, ASSIGNOR OF ONE-THIRD OF HIS INTEREST TO FREDERICK S. SHIRLEY, OF SAME PLACE.

CALENDAR.

SPECIFICATION forming part of Reissued Letters Patent No. 9,390, dated September 28, 1880.

Original No. 186,622, dated January 23, 1877. Application for reissue filed May 19, 1880.

*To all whom it may concern:*

Be it known that I, FREDERICK RATCLIFF, of New Bedford, in the county of Bristol and State of Massachusetts, have invented certain new and useful Improvements in Calendars; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention is for an improvement in calendars, so that by arranging a plate or front, and providing suitable movable or sliding strips or plates bearing the days of the month and months of the year and years, and a strip showing the days of the week, it can be adjusted to form a perpetual calendar.

Figure 1 of the drawings is a representation of a front view of my calendar. Fig. 2 is a back view of same. Fig. 3 is a central vertical section. Fig. 4 is a front view of the sliding card. Fig. 5 represents the faces of the reversible month-strip.

This invention relates to improvements in calendars; and it consists in the detailed construction, combination, and arrangement of parts, substantially as hereinafter more fully set forth and claimed.

In the accompanying drawings, the letter A designates the frame-plate of the calendar. It is nearly rectangular, and is provided with a large reading-aperture, B, and a smaller one, C. In rear of the margin the large aperture B is rabbeted, as shown at $a^2$, for the reception of the glass plate. In rear of the smaller aperture C is located a box, D, which is designed for the reception of a card or paper or other suitable material having the years marked thereon. The back of the main plate, at the upper part of the large reading-aperture, is provided with horizontal and parallel guide-ribs $a$ and $a'$, the former extending entirely across the plate, above said aperture, and the latter extending on each side of said aperture, below the former, and carrying a vertical flange, $b$, which extends across said aperture and forms, with said ribs, a recess for the reception of a card or paper or other suitable material, $m$, on which are marked the months of the year.

$c$ and $c'$ designate horizontal ribs on the back of the plate, below and parallel with those just mentioned. The latter rib, $c'$, extends entirely across the plate, below the lower margin of the large reading-aperture, and the former extends on each side of said reading-aperture a short distance below the ribs $a'$.

Sometimes a single broad rib may be used instead of the two ribs $a'$ and $c$. The distance between the upper edge of the rib $a'$ and the lower edge of the rib $c$ is equal to the width of the strip $d$, which is placed at the back of the glass G, horizontally across, near its upper end.

E indicates flat end loops or guard-arms extending vertically across each end of the plate, and serving to keep the back plate, F, in its place. The lower edge of this back plate rests in the lower ends of said loops or arms, and it is kept from contact with the main plate by resting on the ribs $c$ $c'$. The upper edge of said plate is in contact with the lower edge of the flange $b$, which is rabbeted where it joins the rib $a'$, and forms a guideway for said plate. This plate is slotted centrally and longitudinally at $e$. Between this plate and the main plate, and between the ribs $c$ and $c'$, is located the sliding card $f$, upon which are marked, in a checked arrangement, the numbers of the days of the month. These figures are arranged usually in six horizontal, and thirteen vertical, rows, and in the manner shown at Fig. 4 of the drawings, the seven columns on the right having their figures running in regular rotation, in the manner of an ordinary calendar, when the first day of the month corresponds with the first day of the week. In the six columns on the left the figures are arranged in gradually-decreasing order from right to left, so that when the card is moved from left to right proper figures of the days of the month will come in line below the days of the week on the strip at the back of the glass G. These figures are all in duplicate of each other, excepting the figures 1, 8, 15, 22, and 29. The figure-card contains fifty-seven figures or dates arranged to be successively displayed to indicate dates, and should be placed substantially as shown.

By this arrangement and by means of extra columns of figures other than the central column, comprising duplicates of primary dates, the position of the sliding card of figures may be readily adapted, by shifting the same, to denote dissimilar days and dates. Back of this sliding card is provided an operating loop or handle, *e'*, which extends through the slot *e* and enables said card to be readily adjusted.

The glass plate G is designed to fit in the aperture B so that the edges will lie in the rabbeted margins and its rear surface will be flush with the rear surface of the main plate. Above the strip *d*, containing the days of the week, a space is left equal to the width of the strip *m*, containing the names of the months. This space is filled upon each side with a backing of paper, paint, or other opaque material, as shown at *z*, in such a manner as to leave a central sight-space, *y*, through which the name of one month can be seen. When the parts are put together the figures of the days of the month will appear through the lower part of the glass plate, and above them the names of the days of the week. Above the week-slip the name of the month appears, and, as usually arranged, the year appears through the opening C above all. The strip *m*, carrying the names of the months, is adjustable from side to side, so as to bring the name of any month opposite the sight-space *y* of the glass G. The names of six months are usually arranged on one side of said strip and six on the other, so that the strip is reversible and occupies but half of the longitudinal space it would otherwise take. The year-strip *s* is folded from side to side in the box.

All the strips used in this calendar are adjustable except that which bears the names of the week-days. The calendar is adjusted by bringing the year and month to their respective sight-openings; then the sliding card is moved to bring the first day of the month, which is in the central vertical column, under the day of the week upon which the month commences. The calendar will then be adjusted for all the days of the month referred to.

What I claim as new, and desire to secure by Letters Patent, is—

1. In a calendar, the combination, with the plate A, having openings to expose the days of the week, date, and name of the month, and year-ribs *a a' c c'* and flange *b*, of the month-strip *m*, the card *f*, having the days of the month, the guide-arms E, and the back plate, F, having the slot *e*, which receives the manipulating-projection *e'* on the card *f*, substantially as and for the purpose set forth.

2. The calendar-plate A, having the sight-openings B C, the horizontal ribs *a a' c c'*, the transverse flange *b*, guide-arms E, and back plate, F, substantially as specified.

3. The combination, with the plate A, having the opening B, ribs *a'*, *c*, and *c'*, of the month-strip *m*, the sliding card *f*, carrying the days of the month, and the glass G, having the transverse week-strip *d*, substantially as specified.

In testimony that I claim the foregoing I have hereunto set my hand this 24th day of February, 1880.

FREDERICK RATCLIFF.

Witnesses:
FRANK STONES,
FRANK T. SMITH.